United States Patent
Asada et al.

(10) Patent No.: US 11,091,405 B2
(45) Date of Patent: Aug. 17, 2021

(54) GLUTATHIONE-CONTAINING GRANULAR FERTILIZER

(71) Applicant: KANEKA CORPORATION, Osaka (JP)

(72) Inventors: Takayuki Asada, Hyogo (JP); Toyoaki Watanabe, Hyogo (JP); Ken Uekita, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 82 days.

(21) Appl. No.: 16/516,536

(22) Filed: Jul. 19, 2019

(65) Prior Publication Data

US 2019/0337864 A1 Nov. 7, 2019

Related U.S. Application Data

(63) Continuation of application No. PCT/JP2018/001550, filed on Jan. 19, 2018.

(30) Foreign Application Priority Data

Jan. 20, 2017 (JP) .............................. JP2017-008374

(51) Int. Cl.
| | | |
|---|---|---|
| C05F 11/10 | (2006.01) | |
| C05G 3/00 | (2020.01) | |
| B01J 2/00 | (2006.01) | |
| C05G 5/12 | (2020.01) | |
| B01J 2/28 | (2006.01) | |

(52) U.S. Cl.
CPC ............... *C05F 11/10* (2013.01); *B01J 2/00* (2013.01); *B01J 2/28* (2013.01); *C05G 3/00* (2013.01); *C05G 5/12* (2020.02)

(58) Field of Classification Search
None
See application file for complete search history.

(56) References Cited

U.S. PATENT DOCUMENTS

| | | | |
|---|---|---|---|
| 2010/0016166 A1 | 1/2010 | Ogawa et al. | |
| 2010/0311837 A1 | 12/2010 | Sakai et al. | |
| 2014/0121100 A1* | 5/2014 | Habib | A01N 37/46 |
| | | | 504/100 |
| 2014/0194371 A1* | 7/2014 | Mouri | A23L 33/17 |
| | | | 514/21.8 |

(Continued)

FOREIGN PATENT DOCUMENTS

| | | |
|---|---|---|
| CN | 103635485 A | 3/2014 |
| JP | 2004182549 A | 7/2004 |

(Continued)

OTHER PUBLICATIONS

Extended European Search Report issued in European Application No. 18742074.0, dated Sep. 11, 2020 (5 pages).

(Continued)

*Primary Examiner* — Wayne A Langel
(74) *Attorney, Agent, or Firm* — Osha Bergman Watanabe & Burton LLP

(57) ABSTRACT

A glutathione-containing granular fertilizer includes glutathione, a mineral substance, and starch. The starch may be in an amount of 12% by mass or more with respect to the total amount of the granular fertilizer. The starch may have a water content of 5 to 30% by weight, and may be pregelatinized starch.

12 Claims, 1 Drawing Sheet

(56) References Cited

U.S. PATENT DOCUMENTS

2017/0333518 A1    11/2017    Uekita et al.

FOREIGN PATENT DOCUMENTS

| WO | 2008072602 A1 | 6/2008 |
| WO | 2009099132 A1 | 8/2009 |
| WO | 2013002317 A1 | 1/2013 |
| WO | 2016129512 A1 | 8/2016 |

OTHER PUBLICATIONS

International Search Report issued in corresponding International Application No. PCT/JP2018/001550; dated Mar. 6, 2018 (2 pages).

Written Opinion of the International Searching Authority issued in corresponding International Application No. PCT/JP2018/001550; dated Mar. 6, 2018 (3 pages).

Zhang Wenfu, et al., "Practical Technology of Small Chemical Products", Tianjin Science and Technology Press, pp. 165-166, Oct. 31, 1995 (4 pages).

Office Action issued in corresponding Chinese Patent Application No. 201880007679.3, dated May 8, 2021, with partial translation (12 pages).

\* cited by examiner

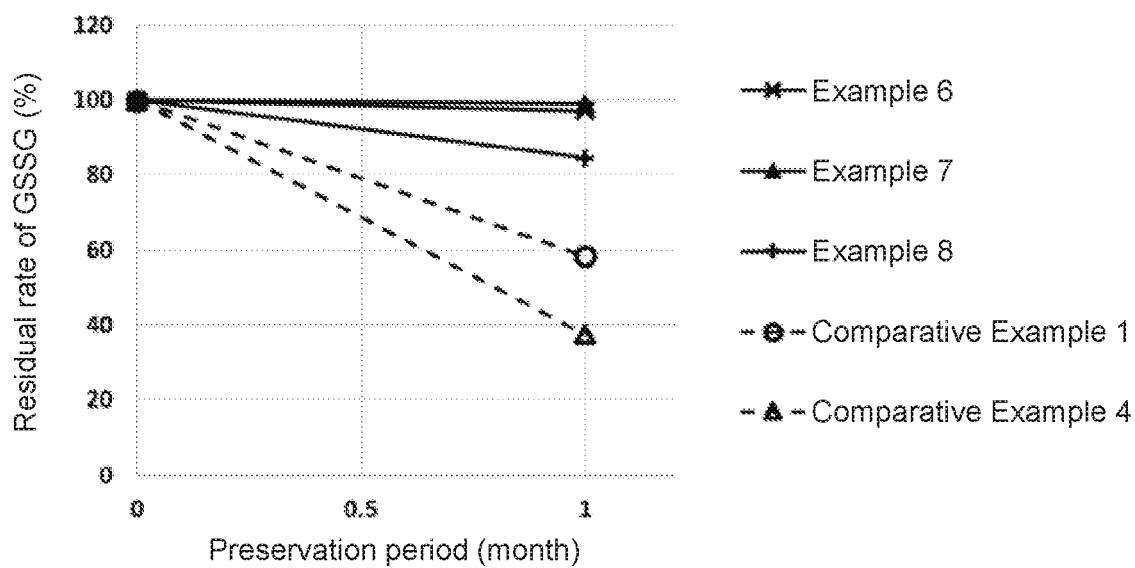

GLUTATHIONE-CONTAINING GRANULAR FERTILIZER

TECHNICAL FIELD

One or more embodiments of the present invention relate to a glutathione-containing granular fertilizer.

BACKGROUND

Glutathione is a peptide consisting of three amino acids, namely, L-cysteine, L-glutamic acid and glycine, and exists not only in human bodies, but also in many living bodies such as other animals, plants, and microorganisms. Glutathione is associated with elimination of active oxygen, detoxification, amino acid metabolism, etc., and thus, it is an important compound for living bodies.

Glutathione is present in a living body in the form of either reduced glutathione (N-(N-γ-L-glutamyl-L-cysteinyl)glycine; hereinafter also referred to as "GSH") that is the form of SH, in which the thiol group of an L-cysteine residue is reduced or oxidized glutathione (hereinafter also referred to as "GSSG"), in which the thiol group of an L-cysteine residue in two molecules of GSH is oxidized, and a disulfide bond is formed between two molecules of glutathione.

It has been known that GSSG is useful in the field of fertilizers, pharmaceutical products, cosmetic products, and the like.

Patent Literature 1 discloses that glutathione (in particular, GSSG) is useful as a plant growth regulator for improving the harvest index of plants, and for example, glutathione increases the number of plant seeds and flowers.

Patent Literature 2 describes that glutathione (GSH or GSSG) has properties by which its quality is decreased by the influence of heat, oxygen, light, etc., and as a result, it may generate unpleasant odor such as sulfur, or may cause a decrease in the content thereof in a preparation, and also that when glutathione is allowed to coexist with arginine, the quality thereof is significantly decreased. Patent Literature 2 proposes to allow glutathione to coexist with arginine and organic acid, so as to suppress decomposition of glutathione during preservation of a preparation and to improve the preservation stability.

CITATION LIST

Patent Literature

Patent Literature 1: international Publication No. WO2008/072602
Patent Literature 2: International Publication No. WO2009/099132
Patent Literature 3: JP Patent Publication (Kokai) No. 2004-182549 A
Patent Literature 4: International Publication No. WO2013/002317

Patent Literature 2 discloses a means for allowing organic acid to coexist with a composition comprising glutathione and arginine, so as to enhance the stability of the glutathione. In this means, the coexistence of arginine and organic acid with glutathione is essential. Arginine is relatively expensive, and thus, does not satisfy the requirements that the preservation stability of glutathione is enhanced by a more inexpensive means. In addition, since a mixture becomes acidic by addition of organic acid, there may be a case where addition of organic acid is not preferable for plants weak to acid. Hence, the means disclosed in Patent Literature 2 cannot achieve the object that is to enhance the stability of glutathione upon the application thereof to plants. Moreover, in the case of producing a granular fertilizer containing a mineral substance, if the hardness of the mineral substance is high, sufficient strength cannot be obtained in some cases.

Patent Literature 3 discloses a method for producing a granular fertilizer having sufficient strength by adopting starch as a binder, However, when the mass of a raw material for the granular fertilizer is defined as 1, if the addition percentage of starch exceeds 5%, the fertilizer becomes too hard and impairs its disintegrability in water. Thus, Patent Literature 3 describes that the addition percentage of starch is preferably set to be 5% or less. Moreover, Patent Literature 3 does not concern at all about the preservation stability of glutathione, and thus, the technique described in Patent Literature 3 is not satisfactory as a technique of improving the preservation stability of glutathione.

SUMMARY

Hence, one or more embodiments of the present invention provide a glutathione-containing granular fertilizer that enhances the preservation stability of glutathione and has sufficient strength.

The present inventors have found that glutathione is stably retained in a granular composition comprising glutathione, a mineral substance, and 12% by mass or more of starch, and sufficient strength can be obtained. One or more embodiments of the present invention have been made based on such new findings. One or more embodiments of the present invention include the following.

(1) A granular fertilizer comprising glutathione and/or a salt thereof, a mineral substance and starch, wherein the starch is in an amount of 12% by mass or more with respect to the total amount of the granular fertilizer.

(2) The granular fertilizer according to the above (1), wherein the starch has a water content of 5% by weight or more and 30% by weight or less.

(3) The granular fertilizer according to the above (1) or (2), wherein the starch is pregelatinized starch.

(4) The granular fertilizer according to any one of the above (1) to (3), which is formed by one or more granulation methods selected from the group consisting of a compression granulation method, a stirring granulation method, a rolling granulation method, a fluidized bed granulation method, and an extrusion granulation method.

(5) The granular fertilizer according to any one of the above (1) to (4), wherein the starch functions as a granulation binder.

(6) The granular fertilizer according to any one of the above (1) to (5), wherein the glutathione and/or a salt thereof are oxidized glutathione and/or a salt thereof.

(7) The granular fertilizer according to any one of the above (1) to (6), wherein the mineral substance is one or more selected from the group consisting of clay, talc, kaolin, diatomaceous earth, vermiculite, montmorillonite, bentonite, zeolite, calcium carbonate, perlite, zeeklite, sericite, mica, acid clay, activated clay, pumice, silica, and white carbon.

(8) The granular fertilizer according to any one of the above (1) to (7), wherein the glutathione and/or a salt thereof is in an amount of 0.0001% by mass or more and 48% by mass or less with respect to the total amount of the granular fertilizer, the mineral substance is in an amount of 40% by mass or more and 87.9999% by mass or less with respect to the total amount of the granular fertilizer, and the starch is in an amount of 59.9999% by mass or less.

(9) The granular fertilizer according to any one of the above (1) to (8), wherein the granular fertilizer has a water content of 10% by weight or less.

(10) The granular fertilizer according to any one of the above (1) to (9), wherein the granular fertilizer has a longitudinal dimension of 0.01 to 10 mm.

(11) A method for producing the granular fertilizer according to any one of the above (1) to (10), comprising forming a mixture of glutathione and/or a salt thereof, a mineral substance and starch, and forming granules from the mixture.

(12) The method according to the above (11), wherein the forming granules from the mixture comprises forming granules from the mixture according to one or more granulation methods selected from the group consisting of a compression granulation method, a stirring granulation method, a rolling granulation method, a fluidized bed granulation method, and an extrusion granulation method.

The present description includes part or all of the contents as disclosed in Japanese Patent Application No. 2017-008374, which is a priority document of the present application.

According to one or more embodiments of the present invention, a granular fertilizer having high preservation stability of glutathione and sufficient strength can be provided.

BRIEF DESCRIPTION OF DRAWINGS

The FIGURE shows GSSG preservation stability in Test 2.

DETAILED DESCRIPTION OF EMBODIMENTS

1. Granular Fertilizer

The granular fertilizer according to one or more embodiments of the present invention comprises glutathione, a mineral substance, and starch. In one or more embodiments of the granular fertilizer of the present invention, glutathione is stably retained, and decomposition of glutathione is suppressed when the glutathione is preserved under conditions accelerating decomposition of the glutathione (e.g., heating conditions).

1-1. Glutathione

In one or more embodiments of the present invention, glutathione may be oxidized glutathione (GSSG) or reduced glutathione (GSM, or may also be a mixture of GSSG and GSH.

GSSG is a compound formed by binding two molecules of GSH (N-(N-γ-L-glutamyl-L-cysteinyl)glycine) with each other via a disulfide bond, and a free form thereof is represented by the following formula.

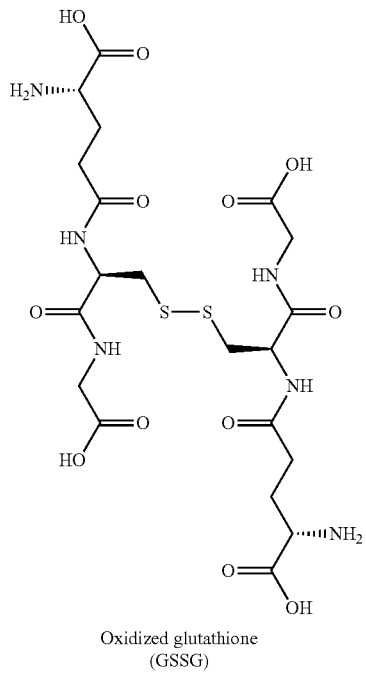

[Formula 1]

Oxidized glutathione
(GSSG)

In one or more embodiments of the present invention, GSSG may include various forms of GSSG, such as a free form in which GSSG is neither bonded to other substance nor ionized, a salt formed by GSSG with an acid or a base, a hydrate thereof, and a mixture thereof.

GSSG has a structure characterized in that two oligopeptide chains consisting of identical amino acid sequences, in which n is 3, are connected with each other via a disulfide bond, mediated by each cysteine residue as a side chain.

In one or more embodiments of the present invention, a granular fertilizer mainly comprising GSSG as glutathione means a granular fertilizer, in which the content of GSSG is relatively higher than the content of GSH, and in one or more embodiments, such a granular fertilizer does not substantially contain GSH. Further, the total mass of GSSG (the mass calculated as a free form), with respect to the total mass of GSSG and GSH (the mass calculated in that they are both free forms) contained in the granular fertilizer according to one or more embodiments of the present invention, may be, in total, 70% by mass or more, more preferably 80% by mass or more, even more preferably 90% by mass or more, further preferably 95% by mass or more, still further preferably 98% by mass or more, and most preferably 100% by mass.

The salt of GSSG is not particularly limited, as long as it is one or more salts that are acceptable depending on purpose, such as an ammonium salt, a calcium salt, a magnesium salt, a sodium salt, and a lithium salt. In one or more embodiments, it is one or more selected from an ammonium salt, a calcium salt, and a magnesium salt. As disclosed in Patent Literature 4, the solid-state ammonium salt, calcium salt, and magnesium salt of GSSG, which have low deliquescency, are easily handled and are highly water-soluble, which may be particularly preferable. Such a salt can be obtained in the form of a solid by allowing GSSG to come into contact with an aqueous medium selected from water and/or a water-soluble medium in the presence of a substance capable of generating at least one selected from an ammonium ion, a calcium ion and a magnesium ion, while heating the mixture to a temperature of 30° C. or higher. The heating temperature is not particularly limited, as long as it is 30° C. or higher, but it may be preferably 33° C. or higher, more preferably 35° C. or higher, and particularly preferably 40° C. or higher. The upper limit of the heating temperature it not particularly limited, but it may be, for example, 80° C. or lower, preferably 70° C. or lower, and particularly preferably 60° C. or lower. In an industrial scale of production, the temperature range of 53° C. to 60° C. may be particularly preferable. The above-described aqueous medium may be used alone, or may also be used in combination of two or more types, as appropriate. The combined use of water and a water-soluble medium is recommended. In this case, water functions as a rich solvent for oxidized glutathione, whereas a water-soluble medium functions as a poor solvent. The volume of such a water-soluble medium may be, for example, approximately 1 to 1000 parts by volume, preferably approximately 5 to 500 parts by volume, more preferably approximately 10 to 100 parts by volume, and particularly preferably approximately 12 to 50 parts by volume, with respect to 10 parts by volume of water. Examples of the water-soluble medium that can be used herein include alcohols (methanol, ethanol, propanol, butanol, ethylene glycol, etc.) and ketones (acetone, methyl ethyl ketone, etc.). Examples of a GSSG salt obtained by the above method include a monoammonium salt of GSSG, a hemicalcium salt or a monocalcium salt of GSSG, or a hemimagnesium salt or a monomagnesium salt of GSSG.

GSH is also referred to as N-(N-γ-L-glutamyl-L-cysteinyl)glycine), in one or more embodiments of the present invention, examples of GSH include various forms of GSH, such as a free form in which GSSG is neither bonded to other substance nor ionized, a salt formed by GSH with an acid or a base, a hydrate thereof, and a mixture thereof.

In one or more embodiments of the present invention, the granular fertilize mainly comprising GSH as glutathione means a granular fertilizer, in which the content of GSH may be relatively higher than the content of GSSG, and in one or more embodiments, such a granular fertilizer does not substantially contain GSSG. Further, the total mass of GSH (the mass calculated as a free form), with respect to the total mass of GSSG and GSH (the mass calculated in that they are both free forms) contained in the above-described granular fertilizer, may be, in total, 70% by mass or more, more preferably 80% by mass or more, even more preferably 90% by mass or more, further preferably 95% by mass or more, still further preferably 98% by mass or more, and most preferably 100% by mass.

The salt of GSH is not particularly limited, as long as it is one or more salts that are acceptable depending on purpose, such as an ammonium salt, a calcium salt, a magnesium salt, a sodium salt, and a lithium salt.

The amount of glutathione mixed is not particularly limited in one or more embodiments of the present invention. The amount of glutathione mixed can be adjusted depending on intended use, in a range in which the effect of improving the harvest index of plants can be obtained, such that glutathione increases the number of plants seeds and flowers when it is applied to the plants. The amount of glutathione mixed into the granular fertilizer according to one or more embodiments of the present invention may be, for example, 0.0001% by mass or more, preferably 0.01% by mass or more, and more preferably 0.1% by mass or more, and also, it may be, for example, 99% by mass or less, preferably 48% by mass or less, more preferably 30% by mass or less, and even more preferably 20% by mass or less, with respect to the total amount of the granular fertilizer.

1-2. Mineral Substance

The mineral substance is not particularly limited in one or more embodiments of the present invention, as long as it can be used as a carrier upon production of the granular fertilizer. As such a mineral substance, at least one selected from, for example, clay, talc, kaolin, diatomaceous earth, vermiculite, montmorillonite, bentonite, zeolite, calcium carbonate, perlite, zeeklite, sericite, mica, acid clay, activated clay, pumice, silica, and white carbon can be used alone or in combination. At least one of clay and talc may be particularly preferably used alone or in combination. The amount of the mineral substance mixed is not particularly limited in one or more embodiments of the present invention. The amount of the mineral substance mixed may be, for example, 40% by mass or more, and preferably 50% by mass or more, and also, it is, for example, 99% by mass or less, preferably 90% by mass or less, and more preferably 87.9999% by mass or less, with respect to the total amount of the granular fertilizer.

1-3. Starch and Other Binder Components

The present inventors have found that when starch is mixed into a granular fertilizer in a predetermined amount or more as a raw material for the granular fertilizer, decomposition of glutathione can be suppressed, and a granular fertilizer having sufficient strength can be produced.

The "starch" according to one or more embodiments of the present invention is a polymer in which α-glucose units are polymerized via a glycoside bond, and comprises bonding water. The bonding water is water found in starch before the starch is mixed with other constituents to produce a composition, and the bonding water includes water naturally occurring in starch. In general, starch, which has not been subjected to a drying process, contains bonding water, in an amount of approximately 5% by weight to approximately 20% by weight based on the weight of the starch, depending on ambient conditions. Moreover, in one or more embodiments of the present invention, water originally contained in starch that can be generally produced and distributed (a crude dry product) is also considered to be "bonding water." The weight average molecular weight of the starch according to one or more embodiments of the present invention may be preferably 1000 or more, 5000 or more, 10000 or more, more preferably 25000 or more, 50000 or more, 75000 or more, 100000 or more, and further preferably 200000 or more, 400000 or more, and 500000 or more.

The source of the starch according to one or more embodiments of the present invention is not particularly limited. At least one starch derived from at least one source selected from, for example, tapioca, corn, wheat, rye, potato, sweet potato, rice, sago, bracken, lotus, arrowroot, and mung beans can be used alone or in combination. From the viewpoint of improving the strength of a product, rye starch, tapioca starch, corn starch and potato starch may be preferable; corn starch and tapioca starch may be more preferable. In order to enhance the preservation stability of glutathione, pregelatinized starch may be particularly preferable.

The content of the starch in the granular fertilizer according to one or more embodiments of the present invention may be 12% by mass or more with respect to the total amount of the raw materials for the granular fertilizer. Besides, the content of the starch in the granular fertilizer according to one or more embodiments of the present invention is not particularly limited, as long as it is in said range and the granular fertilizer has sufficient strength. The content of the starch may be, for example, preferably 15% by mass or more, and more preferably, 20% by mass or more, and it is also, for example, 99% by mass or less, preferably 80% or less, more preferably 60% by mass or less, and particularly preferably 59.9999% by mass or less. The starch has the properties of a binder. The viscosity thereof increases, as the starch absorbs moisture. Accordingly, in order to improve operability during granulation, such as suppression of adhesion to the apparatus, the starch may be preferably mixed into the granular fertilizer in the range of 20% by mass or more and 60% by mass or less.

The water content in the starch according to one or more embodiments of the present invention is not particularly limited, as long as it is within the above-described range of the mixed amount. In one or more embodiments, the higher the water content in the starch, the more preferable it is. The water content in the starch may be, for example, preferably 5% by weight or more, and more preferably 7% by weight or more, 12% by weight or more, or 13% by weight or more. On the other hand, the water content in the starch may be more preferably 30% by weight or less, further preferably 25% by weight or less, particularly preferably 20% by weight or less, and most preferably 17% by weight or less. The water content in the starch indicates the ratio of the weight of water contained in the starch to the total weight of the starch before being mixed with other constituents. The water content in the starch can be measured by the method described in Examples.

The present inventors have surprisingly found that as the water content in the starch adopted as a raw material for the granular fertilizer increases, the strength of the granular fertilizer increases. Further, in general, it has been known that when the water content in a composition containing glutathione is high, decomposition of the glutathione is promoted. However, the present inventors have also surprisingly found that the preservation stability of glutathione can be high, even in a case where the water content in the mixed starch is high. That is to say, glutathione is stably present in a granular fertilizer produced by mixing starch therein, regardless of the type of the starch, and such a granular fertilizer has sufficient strength.

In one or more embodiments of the present invention, the starch mainly functions as a granulation binder (hereinafter also referred to as a "binder"), and in the granular fertilizer according to one or more embodiments of the present invention, only the starch can be used as such a binder. However, the starch may also be used in combination with another binder that is commonly adopted upon the production of granular fertilizers (e.g., a thickener, a binding agent, water. etc.). Examples of the binder that is commonly adopted upon the production of granular fertilizers include carboxymethyl cellulose, methyl cellulose, ethyl cellulose, polyvinyl pyrrolidone, Pullulan, an acrylic polymer, polyvinyl alcohol, gelatin, agar, gum Arabic, gum Arabic powder, xanthan gum, trang gum, guar gum, gellan gum, locust bean gum, macrogol, tragacanth gum, β glucan, pectin, casein, soybean protein, hydroxyethyl cellulose, acetyl cellulose, lignin sulfonic acid, carboxymethyl starch, hydroxyethyl starch, polyvinyl methyl ether, hydroxypropyl cellulose, hydroxypropylmethyl cellulose, polyethylene glycol, polyethylene oxide, polyvinyl pyrrolidone, shellac, rosin, tall oil, ester gum, polyvinyl acetate, polylactic acid, polyvinyl chloride, polyester, polyurea, polyamide, cumarone resin, a biodegradable polymer, paraffin wax, microcrystalline wax, petrolatum, montan wax, carnauba wax, cotton wax, beeswax, wool wax, a polymeric non-ionic surfactant, a polymeric anionic surfactant, a polymeric cationic surfactant, a polymeric amphoteric surfactant, and alginic acid (the compounds listed above are polymeric compounds), sodium silicate, glycerin, animal and vegetable oils, fat and oil, liquid paraffin, heavy oil, glucose, sucrose, mannitol, sorbitol, a non-polymeric non-ionic surfactant, a non-polymeric anionic surfactant, a non-polymeric cationic surfactant, and a non-polymeric amphoteric surfactant (the compounds listed above are non-polymeric compounds). Examples include carboxymethyl cellulose, methyl cellulose, ethyl cellulose, polyvinyl alcohol, gum Arabic, xanthan gum, lignin sulfonic acid, water, paraffin, liquid paraffin, and polyethylene glycol.

1-4. Other Components

Examples of components that may be contained in the granular fertilizer according to one or more embodiments of the present invention, other than the above-described components, include organic carriers, excipients, and fertilizer components.

Examples of the organic carriers that may be contained in the granular fertilizer according to one or more embodiments of the present invention include: dried plant materials, such as rice hulls, sawdust, soy flour, corn stalks, or plant fibers; and organic porous carriers, such as pulp flock, white carbon, or activated carbon.

Examples of the excipients that may be contained in the granular fertilizer according to one or more embodiments of the present invention include lactose, trehalose, and cellulose.

Examples of the fertilizer components that may be contained in the granular fertilizer according to one or more embodiments of the present invention include elements useful as fertilizers, such as potassium, nitrogen, phosphorus, calcium, and magnesium.

The water content in the granular fertilizer according to one or more embodiments of the present invention may be preferably 10% by weight or less with respect to the total amount of the granular fertilizer.

2. Production Method

Examples of a method of granulating the granular fertilizer according to one or more embodiments of the present invention that may be applied herein include granulation methods adopted in a step of producing a common granular fertilizer, such as stirring granulation, rolling granulation, fluidized bed granulation, extrusion granulation, and compression granulation. A method comprising forming a mixture of glutathione, a mineral substance and starch, and granulating the mixture, may be preferably applied. The granulation step may comprise further steps, such as adjusting shape of granules, drying, as necessary.

Herein, it has been known that when the water content in a composition comprising glutathione is high, decomposition of the glutathione may be accelerated and preservation stability may be decreased. Hence, from the viewpoint of improving the preservation stability of glutathione, the water content in the granular fertilizer according to one or more embodiments of the present invention may be preferably low, and thus, the water content may be preferably 10% by weight or less, and more preferably 5% by weight or less. Accordingly, in the method of producing the granular fertilizer according to one or more embodiments of the present invention, reducing the amount of a liquid (e.g., water, etc.) used or using no liquid may be preferable. In addition, when a liquid (e.g., water, etc.) is used in the method of producing the granular fertilizer according to one or more embodiments of the present invention, a drying step may be preferably carried out after completion of the granulation step. When a liquid (e.g., water, etc.) is not used in the step of producing the granular fertilizer according to one or more embodiments of the present invention, a granular fertilizer having high preservation stability of glutathione can be produced, even without the drying step.

The shape or size of the grains of the granular fertilizer according to one or more embodiments of the present invention obtained by the above-described granulation step is not particularly limited. From the viewpoint of workability and labor saving during application of the fertilizer, the shape of the present granular fertilizer may be preferably a sphere, and regarding the size of the fertilizer, the longitudinal dimension of each grain may be preferably 0.01 to 10 mm, more preferably 0.05 to 6 mm, and particularly preferably 2 to 4 mm.

3. Granular Fertilizer Evaluation Test 3-1. Strength Test

The strength of a sample (granular fertilizer) means crushing strength in the present description, and the crushing strength of such a sample is measured using a digital hardness tester (manufactured by Fujiwara Scientific Company Co., Ltd.). The measurement method is as follows.

A single sample (a single grain) is placed on an even balance, and a flat section with a diameter of 5 mm is pressed against the sample. A load needed when the grain is crushed is read. Loads necessary for a total of 10 grains are measured, and a mean value thereof is defined to be the crushing strength (kgf) of the granular fertilizer. In order to suppress the pulverization of the granular fertilizer during transportation, it may be preferable for the granular fertilizer to have a crushing strength of 0.5 kg or more. As such, the "sufficient strength" typically means that the crushing strength is 0.5 kg or more. The crushing strength may be preferably 15 kg or less, or 10 kg or less, since the granular fertilizer having such crushing strength is easily disintegrated in the soil.

3-2. Preservation Stability Test

In the present description, the preservation stability of glutathione in a sample (granular fertilizer) is measured by the following method.

A sample is placed in an aluminum-laminated bag (Lamizip L-9 or AL-D), and the bag is hermetically sealed by heat sealing. It is to be noted that the bag is not degassed upon the hermetical sealing. Each sample is preserved by being left at rest at 60° C. in an incubator for 1 month, and thereafter, the amount of glutathione contained in the preserved sample is measured by HPLC (detection wavelength: 210 nm). The percentage of the amount of glutathione contained in the preserved sample to the amount of glutathione contained in the sample immediately before the test is defined as a residual rate (%), and this residual rate is used as an indicator of the preservation stability of glutathione.

In one or more embodiments of the present invention, a granular fertilizer, in which the residual rate of glutathione is 75% or more or 90% or more, can be obtained.

EXAMPLES

Hereinafter, one or more embodiments of the present invention will be described with reference to specific examples. However, the following specific examples are not intended to limit the scope of the present invention.

<Test 1>

A granulated product (granular fertilizer) was produced by compression granulation using a raw material consisting of 0.6 parts by mass of oxidized glutathione, 69.4 parts by mass of clay, and 30 parts by mass of a granulation binder (starch). The strength of granulated product was then measured.

As oxidized glutathione, monoammonium salts (GSSG.NH3) manufactured by Kaneka Corporation were used. As clay, NK-300 manufactured by SHOW A KDE CO., LTD. was used. In addition, the types of starch shown in Table 1 were used as a granulation binder. The granulation method is as follows.

The above-described raw material (total amount: 100 g) was fully blended, and thereafter, using a tableting machine (HANDTAB-100, manufactured by ICHIHASHI SEIKI KYOTO JAPAN), the resulting raw material was tableted by applying a pressure of 10 kN thereto through an oil hydraulic pump (ENERPAC P142, manufactured by Applied Power Japan Ltd.), thereby obtaining a granulated product. The crushing strength of each of the obtained granulated products was measured in accordance with Strength Test described in the above section 3-1. The measurement results of individual granulated products are shown in Table 1.

Moreover, the amount of water contained in each of the above-described granulation binders (starches) (water content, % by weight) was measured using an infrared aquameter (Kett Electric Laboratory) under measurement conditions of 3 g of each sample, 110° C., and 15 minutes. The water content in each granulation binder is shown in Table1.

The granulated products of Examples 1 to 5 comprising starch as a granulation binder had a crushing strength of 0.5 kgf or more.

Furthermore, the results of Examples 1 to 5 showed a tendency that higher water content in the starch adopted as a binder provides higher strength of the granulated product.

TABLE 1

|  | Granulation binder | Distributer | Product name | Water content (weight %) | Crushing strength (kgf) |
| --- | --- | --- | --- | --- | --- |
| Example 1 | Corn starch | Sanwa Starch Co., Ltd. | Corn Alpha Y | 13 | 7.2 |
| Example 2 | Tapioca starch | Sanwa Starch Co., Ltd. | Tapioca Alpha for Industry | 12 | 4.0 |
| Example 3 | Potato starch | Matsutani Chemical Industry Co., Ltd. | Matsunorin M | 7 | 2.8 |
| Example 4 | Rye starch | Numada Flour Mills | Rye Binder | 5 | 1.3 |
| Example 5 | Tapioca starch | Sanwa Starch Co., Ltd. | Tapioca Alpha NTP | 5 | 0.6 |

<Test 2>

Glutathione-containing fertilizers having the compositions shown in Table 2 were produced by compression granulation, and thereafter, the success or failure of granulation, crushing strength, the water content in a granulated product, and preservation stability were then confirmed. It is to be noted that the numerical values shown in Table 2 each indicate "part by mass mass %)."

The same oxidized glutathione and clay as those used in the above-described Test 1 were used. As talc, SSS manufactured by Nippon Talc Co., Ltd. was used. As potassium sulfate, the product manufactured by SESODA CORPORA- TION was used. As ammonium dihydrogen phosphate, the product manufactured by Shimonoseki Mitsui Chemicals, Inc. was used. As starches, Tapioca. Alpha for Industry manufactured by Sanwa Starch Co., Ltd. (hereinafter also referred to as "tapioca starch"), Corn Alpha Y manufactured by Sanwa Starch Co., Ltd. (hereinafter also referred to as "corn starch 1"), and Corn Starch Y manufactured by Sanwa Starch Co., Ltd. (hereinafter also referred to as "corn starch 2") were used. It is to be noted that the above-described tapioca starch and corn starch 1 are both pregelatinized starch. As montmorilionite, Kunipia F manufactured by KUNIMINE INDUSTRIES CO., LTD. was used, and as bentonite, 250 FA-B manufactured by SANLITU INDUSTRY Corporation was used. As lignin sulfonic acid, San Extract P202 manufactured by NIPPON PAPER INDUSTRIES CO., LTD. was used. As silicon dioxide, the product manufactured by DSL, Japan was used. As CMCNa, the product manufactured by DKS Co. Ltd. was used. Granulation was carried out by the same method as that of Test 1, and the success or failure of the granulation was then evaluated. The success or failure of the granulation was evaluated from the following viewpoints. That is, the above-described granulation method was carried out, and a granulated product obtained without problems was evaluated to be "A," whereas a granulated product, which was easily crushed when it was held with a hand or caused tableting disorder such as capping, was evaluated to be "B." Moreover, the crushing strength of each granulated product was measured in accordance with Strength Test described in the above section 3-1. The measurement results of individual granulated products are shown in Table 2. In addition, the preservation stability of glutathione in each granulated product was measured in accordance with Preservation Stability Test described in the above section 3-2. The measurement results of individual granulated products are shown in Table 2 and the Figure. Furthermore, the results obtained by measuring the water content in each granulated product are shown in Table 2. The amount of water contained in each granulated product (water content, % by weight) was measured using an infrared aquameter (Kett Electric Laboratory) under measurement conditions of 3 g of each sample, 110° C., and 15 minutes.

The granulated products of Examples 6 to 8 comprising starch as a granulation binder, the granulated product of Comparative Example 1 comprising montmorillonite as a granulation binder, and the granulated product of Comparative Example 4 comprising water and CMCNa as granulation binders, had a crushing strength of 0.5 kgf or more. On the other hand, in the case of the granulated product of Comparative Example 2 comprising bentonite as a granulation binder and the granulated product of Comparative Example 3 comprising lignin sulfonic acid as a granulation binder, their crushing strength was unmeasurable (crushing strength: less than 0.5 kgf).

Moreover, the granulated products of Examples 6 to 8 comprising starch as a granulation binder had a higher amount of water therein (water content in each granulated product), than the granulated product of Comparative Example 1 comprising montmorillonite as a granulation binder and the granulated product of Comparative Example 4 comprising water and CMCNa as granulation binders. However, the granulated products of Examples 6 to 8 had significantly improved preservation stability of GSSG in comparison to those of Comparative Examples 1 and 4.

Furthermore, the granulated products of Examples 6 and 7 comprising pregelatinized starch as a granulation binder had higher GSSG preservation stability than the granulated product of Example 8 comprising non-pregelatinized starch as a granulation binder.

TABLE 2

| | Example 6 | Example 7 | Example 8 | Comparative Example 1 | Comparative Example 2 | Comparative Example 3 | Comparative Example 4 |
|---|---|---|---|---|---|---|---|
| GSSG•NH$_3$ | 0.6 | 0.6 | 0.6 | 0.6 | 0.6 | 0.6 | 0.6 |
| Potassium sulfate | 8.8 | 8.8 | 8.8 | 8.8 | 8.8 | 8.8 | 8.8 |
| Ammonium dihydrogen phosphate | 1.8 | 1.8 | 1.8 | 1.8 | 1.8 | 1.8 | 1.8 |
| Clay | 48.8 | 48.8 | 48.8 | 48.8 | 48.8 | 48.8 | 73.8 |
| Talc | 10.0 | 10.0 | 10.0 | 10.0 | 10.0 | 10.0 | 10.0 |
| Tapioca starch | 30.0 | — | — | — | — | — | — |
| Corn starch 1 | — | 30.0 | — | — | — | — | — |
| Corn starch 2 | — | — | 30.0 | — | — | — | — |
| Montmorillonite | — | — | — | 30.0 | — | — | — |
| Bentonite | — | — | — | — | 30.0 | — | — |
| Lignin sulfonic acid | — | — | — | — | — | 30.0 | — |
| CMCNa | — | — | — | — | — | — | 1.0 |
| Silicon dioxide | — | — | — | — | — | — | 1.0 |
| Industrial water | — | — | — | — | — | — | 3.0 |
| Success or failure of granulation | A | A | A | A | B | B | A |
| Crushing strength (kgf) | 4.7 | 5.6 | 2.2 | 4.0 | — | — | 2.4 |
| Water content in granulated substance (weight %) | 3.9 | 4.1 | 4.4 | 3.3 | — | — | 3.2 |
| Residual rate (%) | 97.2 | 98.9 | 84.5 | 58.4 | — | — | 37.5 |

<Test 3>

A glutathione-containing fertilizer having each composition shown in Table 3 was produced by compression granulation, and thereafter, the strength of a granulated product was confirmed. It is to be noted that the numerical values shown in Table 3 each indicate "part by mass (mass %)."

The same oxidized glutathione, clay, talc, potassium sulfate, and ammonium dihydrogen phosphate as those used in Test 2 were used. As corn starch, the same Corn Alpha Y as that in Test 2 was used. The granulation method is as follows.

The above-described raw material (total amount: 5 kg) was fully blended using Henschel mixer (FM20B, manufactured by MITSUI MIIKE MACHINERY CO., LTD.) or the like, and thereafter, using a briquette machine (BGSINO18, manufactured by SINTO KOGIO, LTD.), the obtained mixture was subjected to roll pressurization under operation conditions of a roll oil pressure of 16.5 MPa, a roll rotational speed of 50 Hz, a screw rotational speed of 20 Hz, and a roll pressure of 25 to 35 kN, so as to obtain a briquetted granulated product (platy granulated product). The obtained platy granulated product was crushed to individual grains to obtain a granulated product. The crushing strength of each granulated product was measured in accordance with Strength Test described in the above section 3-1. The measurement results of individual granulated products are shown in Table 3.

The granulated product of Comparative Example 5 comprising 10 parts by mass of starch with respect to the total mass thereof had a crushing strength of less than 0.5 kgf. On the other hand, the granulated product of Example 9 comprising 15 parts by mass of starch with respect to the total mass thereof and the granulated product of Example 10 comprising 20 parts by mass of starch with respect to the total mass thereof had a crushing strength of 0.5 kgf or more.

TABLE 3

|  | Comparative Example 5 | Example 9 | Example 10 |
|---|---|---|---|
| GSSG•NH₃ | 0.6 | 0.6 | 0.6 |
| Potassium sulfate | 8.8 | 8.8 | 8.8 |
| Ammonium dihydrogen phosphate | 1.8 | 1.8 | 1.8 |
| Clay | 68.8 | 63.8 | 58.8 |
| Talc | 10.0 | 10.0 | 10.0 |
| Corn starch | 10.0 | 15.0 | 20.0 |
| Crushing strength (kgf) | 0.35 | 1.01 | 1.68 |

All publications, patents and patent applications cited in the present description are incorporated herein by reference in their entirety.

Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

What is claimed is:

1. A granular fertilizer, comprising:
   glutathione and/or a salt thereof;
   a mineral substance; and
   starch, wherein the starch is in an amount of 12% by mass or more with respect to the total amount of the granular fertilizer; and
   wherein the starch has a water content of 7% by weight or more.

2. The granular fertilizer according to claim 1, wherein the starch has a water content of 7 to 30% by weight.

3. The granular fertilizer according to claim 1, wherein the starch is pregelatinized starch.

4. The granular fertilizer according to claim 1, wherein the granular fertilizer is formed by one or more granulation methods selected from the group consisting of a compression granulation method, a stirring granulation method, a rolling granulation method, a fluidized bed granulation method, and an extrusion granulation method.

5. The granular fertilizer according to claim 1, wherein the starch functions as a granulation binder.

6. The granular fertilizer according to claim 1, wherein the glutathione and/or a salt thereof are oxidized glutathione and/or a salt thereof.

7. The granular fertilizer according to claim 1, wherein the mineral substance is one or more selected from the group consisting of clay, talc, kaolin, diatomaceous earth, vermiculite, montmorillonite, bentonite, zeolite, calcium carbonate, perlite, zeeklite, sericite, mica, acid clay, activated clay, pumice, silica, and white carbon.

8. The granular fertilizer according to claim 1, wherein the granular fertilizer comprises:
   0.0001 to 48% by mass of the glutathione and/or a salt thereof;
   40 to 87.9999% by mass of the mineral substance; and
   12 to 59.9999% by mass of the starch.

9. The granular fertilizer according to claim 1, wherein the granular fertilizer has a water content of 10% by weight or less.

10. The granular fertilizer according to claim 1, wherein the granular fertilizer has a longitudinal dimension of 0.01 to 10 mm.

11. A method for producing the granular fertilizer according to claim 1, comprising:
    forming a mixture of the glutathione and/or the salt thereof, the mineral substance, and the starch; and
    forming granules of the mixture, so as to produce the granular fertilizer of claim 1.

12. The method according to claim 11, wherein the forming granules of the mixture is performed by one or more granulation methods selected from the group consisting of a compression granulation method, a stirring granulation method, a rolling granulation method, a fluidized bed granulation method, and an extrusion granulation method.

* * * * *